(12) United States Patent
Branchereau

(10) Patent No.: US 8,188,820 B2
(45) Date of Patent: May 29, 2012

(54) SHAFT ENCODER, DEVICE COMPRISING SUCH AN ENCODER AND METHOD OF MANUFACTURING SUCH AN ENCODER

(75) Inventor: Bernard Branchereau, Segre (FR)

(73) Assignee: Hutchinson S.A. (FR)

( * ) Notice: Subject to any disclaimer, the term of this patent is extended or adjusted under 35 U.S.C. 154(b) by 1102 days.

(21) Appl. No.: 11/682,650

(22) Filed: Mar. 6, 2007

(65) Prior Publication Data

US 2007/0209438 A1    Sep. 13, 2007

(30) Foreign Application Priority Data

Mar. 6, 2006 (FR) ...................................... 06 01983

(51) Int. Cl.
*H01H 9/00* (2006.01)
*F16C 32/00* (2006.01)
*F16C 41/04* (2006.01)

(52) U.S. Cl. ........................................ 335/209; 384/448
(58) Field of Classification Search .................. 335/209; 384/448

See application file for complete search history.

(56) References Cited

U.S. PATENT DOCUMENTS

| | | | | |
|---|---|---|---|---|
| 3,742,243 A * | 6/1973 | Gamble | ...................... | 307/106 |
| 5,431,413 A * | 7/1995 | Hajzler | ...................... | 277/317 |
| 6,472,784 B2 * | 10/2002 | Miekka et al. | ................ | 310/68 R |
| 6,637,754 B1 * | 10/2003 | Ohtsuki et al. | ................ | 277/549 |
| 6,692,153 B2 * | 2/2004 | Ohtsuki et al. | ................ | 384/448 |
| 6,777,838 B2 * | 8/2004 | Miekka et al. | ................ | 310/67 R |
| 6,789,948 B2 * | 9/2004 | Nakajima | ...................... | 384/448 |
| 6,979,001 B2 * | 12/2005 | Ohtsuki et al. | ................ | 277/549 |
| 2001/0051010 A1 * | 12/2001 | Toda et al. | ...................... | 384/448 |
| 2002/0126926 A1 * | 9/2002 | Ohtsuki et al. | ................ | 384/448 |
| 2002/0131659 A1 | 9/2002 | Rutter et al. | | |
| 2003/0059139 A1 * | 3/2003 | Nakajima | ...................... | 384/448 |
| 2004/0066187 A1 * | 4/2004 | Schroter et al. | .......... | 324/207.22 |
| 2004/0086212 A1 * | 5/2004 | Ohtsuki et al. | ................ | 384/448 |
| 2004/0124586 A1 | 7/2004 | Branchereau | | |
| 2004/0165799 A1 * | 8/2004 | Nakajima et al. | .............. | 384/448 |
| 2004/0179760 A1 * | 9/2004 | Nakajima et al. | .............. | 384/448 |
| 2004/0196027 A1 * | 10/2004 | Iwamoto et al. | ......... | 324/207.21 |
| 2006/0049821 A1 * | 3/2006 | Fayaud et al. | ................. | 324/167 |
| 2006/0078369 A1 | 4/2006 | Spratte | | |

FOREIGN PATENT DOCUMENTS

| | | |
|---|---|---|
| DE | 103 38 833 | 3/2005 |
| EP | 1 418 371 | 5/2004 |
| EP | 1 517 149 | 3/2005 |
| FR | 2 777 060 | 10/1999 |
| FR | 2 868 525 | 10/2005 |
| FR | 2 875 005 | 3/2006 |
| WO | WO 2005/100923 | 10/2005 |

OTHER PUBLICATIONS

French Search Report, Nov. 10, 2006, 2 pages.

* cited by examiner

*Primary Examiner* — Lincoln Donovan
*Assistant Examiner* — Alexander Talpalatskiy
(74) *Attorney, Agent, or Firm* — St. Onge Steward Johnston & Reens LLC

(57) ABSTRACT

Displacement encoder for a moving shaft, comprising a sleeve intended to be fitted onto the shaft and at least one permanent magnet forming at least one polarized magnetic mark. An elastomer layer lies between the permanent magnet and the sleeve. This elastomer layer is adhesively bonded to the permanent magnet and to the sleeve. The invention also relates to a device for a moving shaft comprising such an encoder and to the method of manufacturing the encoder.

14 Claims, 4 Drawing Sheets

SHAFT ENCODER, DEVICE COMPRISING SUCH AN ENCODER AND METHOD OF MANUFACTURING SUCH AN ENCODER

CROSS-REFERENCE TO RELATED APPLICATIONS

The present application claims priority from French patent application 06 01983 filed on Mar. 6, 2006, the content of which is incorporated herein by reference.

FIELD OF THE INVENTION

The present invention relates to a displacement encoder for a moving shaft, and more particularly to an encoder comprising a sleeve intended to be fitted onto the shaft and a permanent magnet forming at least one polarized magnetic mark.

BACKGROUND OF THE INVENTION

In many applications, and especially for wheel shafts, gearbox output shafts or crankshafts of internal combustion engines, the rotating shafts are equipped with an angular displacement encoding device in order to determine their instantaneous rotation speed and/or their angular position and/or their direction of rotation.

The encoding function may be performed by one or more polarized magnetic marks that form an encoding zone, the displacement of which is detected by a magnetic field detector placed facing this encoding zone. For such an encoder, it is known, for example from FR-A 2 777 060, to produce the mark(s) in the encoding zone using a layer of "elastoferrite", that is to say a polymer of the elastomer type containing a high proportion of magnetic particles such as, for example, ferrite powder particles, which is adhesively bonded to the sleeve of the encoder while it is being moulded. Such a solution is practical to implement owing to the formation of the magnetic layer and the polarized marks, and also the adhesion of this layer to the sleeve during the moulding process.

However, the intensity of the magnetic field produced by the elastoferrite is insufficient for some applications. To increase the intensity of the magnetic field created by an elastoferrite, it is known to increase the proportion of magnetic particles. However, the density of magnetic particles achieved hitherto make the elastoferrite too brittle and friable for certain applications.

It is also known, for example from EP-A-1 517 149, to produce the marks in the encoding zone using a permanent magnet, that is to say for example made of a ferrite, or made of neodymium iron boron (NdFeB). Such a solution makes it possible to increase the intensity of the magnetic field produced. In that document, the permanent magnet is fastened to the sleeve by continuous or discontinuous peripheral crimping. This crimping may be carried out by locally deforming part of the cylindrical sleeve, at a number of spaced-apart points, against the permanent magnet. This crimping may also be carried out by deforming a series of tongues on the periphery of the sleeve against the permanent magnet.

However, all these permanent magnets are made of materials known for their corrosion sensitivity, but also for their brittleness, that is to say their sensitivity to cracking when exposed to excessively high mechanical stresses. These stresses may arise from crimping the sleeve against the permanent magnet, or from the vibrations of the shaft, or else from impacts from materials thrown up when a vehicle is being driven.

SUMMARY OF THE INVENTION

The object of the present invention is to alleviate these drawbacks by proposing a displacement encoder having a high magnetic field intensity and good vibration and impact resistance.

For this purpose, one subject of the present invention is a displacement encoder of the aforementioned type, characterized in that an elastomer layer lies between the permanent magnet and the sleeve and in that said elastomer layer is adhesively bonded to the permanent magnet and to the sleeve.

The encoder thus produced is particularly resistant to vibrations thanks to the elastomer layer that filters out and damps the vibrations between the sleeve exposed to the vibrations of the shaft and the permanent magnet(s). Thus, the magnet is less subject to deterioration.

In addition, the encoder thus produced exhibits very good mechanical integrity thanks to the strong adhesion between the magnet and the elastomer layer, and then between the same elastomer layer and the sleeve. In addition, this means of fastening by adhesion is not very sensitive to vibrations and does not produce mechanical stresses in the permanent magnet, unlike the other mechanical fastening means such as crimping.

In preferred embodiments of the invention, one or more of the following arrangements may furthermore be provided:

the elastomer layer has a thickness ranging between 0.01 mm and 3 mm;

the elastomer of the layer lying between the permanent magnet and the sleeve is a thermoplastic elastomer;

the permanent magnet is of the plastic magnet type;

the permanent magnet has a protective layer, thus improving its oxidation resistance;

the protective layer is a thin film of material plasma-deposited directly on the permanent magnet;

the protective layer is an elastomeric adhesive, thereby simplifying the manufacturing method, and is inexpensive;

the sleeve is made of plastic. This has the advantages of being more economic and of allowing many facilities for adhesion to materials such as thermoplastic elastomers that can possibly be used for example for the elastomer layer between the sleeve and the permanent magnet; and at least one annular lip is intended to come into contact with a stationary casing that surrounds the moving shaft.

The invention also relates to a device comprising a shaft that can move relative to a stationary casing and a displacement encoder that comprises a sleeve fitted onto the shaft and a permanent magnet forming at least one polarized magnetic mark, characterized in that an elastomer layer lies between the permanent magnet and the sleeve and in that said elastomer layer is adhesively bonded to the permanent magnet and to the sleeve.

This device may further include a liquid that fills the casing and at least one annular lip that is fastened to the encoder, said lip being in sliding contact with the casing and sealing between said shaft and said casing.

Moreover, the subject of the invention is a method of manufacturing a displacement encoder comprising a sleeve intended to be fitted onto the shaft and at least one permanent magnet forming at least one magnetic mark, characterized in that it comprises the following steps:

(i) said sleeve is placed in a first half-mould;
(ii) the permanent magnet is placed in a second half-mould;
(iii) the mould is closed, the permanent magnet lying at some distance from the sleeve; and
(iv) an elastomer layer, introduced beforehand between the sleeve and the permanent magnet, is vulcanized so as to shape said elastomer layer to a defined profile and to adhere said elastomer layer to the sleeve and to the permanent magnet.

For this manufacturing process, the elastomer layer introduced prior to the vulcanization step (iv) may be introduced:
- either by injection or transfer into the closed mould;
- or by placing an elastomer preform in the mould before it is closed.

This method may also include, prior to the placement steps (i) and (ii), a surface treatment of the sleeve and/or of the permanent magnet by a suitable treatment comprising the deposition of at least one adhesion layer.

This method may also include an operation to form the polarized marks by applying a magnetic field to the permanent magnet after the vulcanization step (iv).

BRIEF DESCRIPTION OF THE DRAWINGS

Other features and advantages of the invention will become apparent over the course of the description that follows, given by way of non-limiting examples and with reference to the appended drawings in which.

DETAILED DESCRIPTION OF THE INVENTION

In the various figures, the same references have been retained for denoting identical or similar elements.

Figure 1:
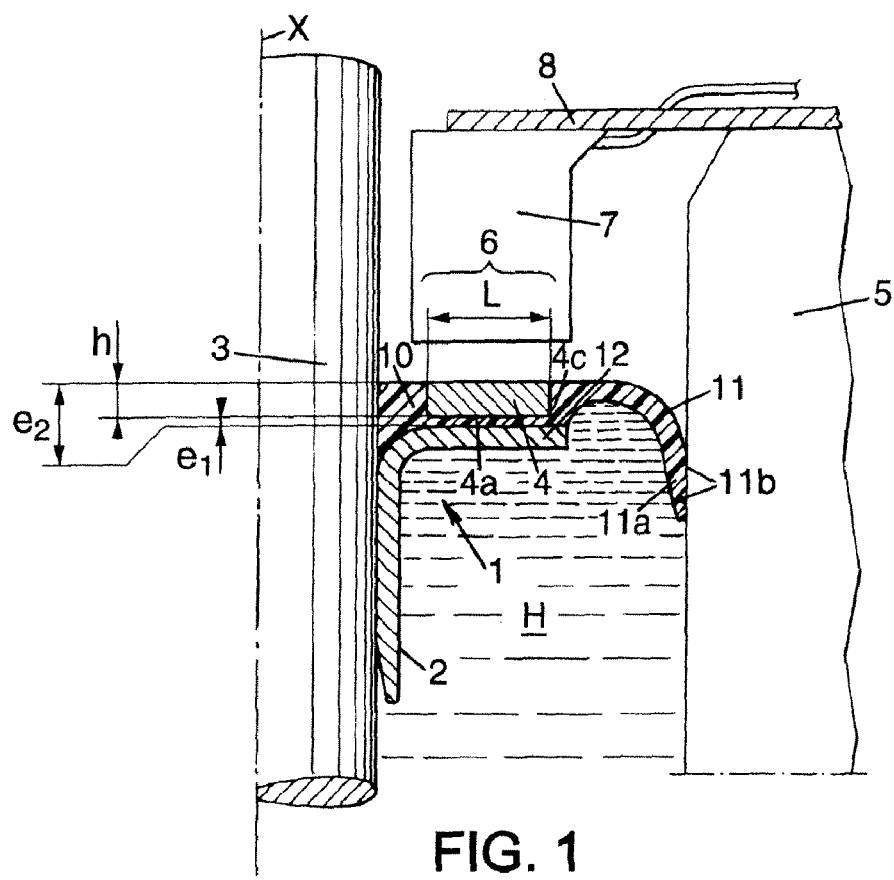
FIG. 1 is a simplified longitudinal sectional view of a shaft provided with a displacement encoder according to a first embodiment of the invention.

As may be seen in FIG. 1, the angular encoder 1 comprises a sleeve 2 fitted so as to rotate on a rotating shaft 3 through the opening in a stationary casing 5. Polarized magnetic marks are provided in a zone 6 of the encoder, called the encoding zone.

The stationary casing 5 that surrounds the angular encoder 1 serves as a fixed base for a sensor 7 attached to the casing via a plate 8.

The rotating shaft 3 may consist of any shaft of a rotating machine, such as a drive shaft or a wheel shaft. It should be noted, on the one hand, that the angular encoder 1 is not necessarily placed on a portion of the shaft surrounded by a stationary casing, but may be placed at a certain distance from any casing or bearing provided that a sensor can be kept close to the encoding zone 6. On the other hand, it could be a shaft undergoing a translational movement along its longitudinal axis X.

The sleeve 2 is mounted on the shaft 3 by force-fitting. This particularly simple mounting method prevents the sleeve 2 from moving both rotationally and translationally relative to the shaft 3. However, it is possible to use any other mounting method preventing the sleeve from rotating relative to the shaft. The sleeve is often made of metal, but it may be advantageous to use a sleeve made of plastic.

The encoding zone 6 has a number of polarized marks and a shape, here a plane annular shape, which are suitable so that its displacement with the shaft 3 makes it possible to determine, for example, the angular position, the rotation speed or the direction of rotation of the shaft.

The polarized marks in the encoding zone 6 are formed by a succession of angular sectors polarized alternately north-south, possibly with a non-polarized sector or a polarized zone that is more extensive or less extensive than the others, so as to determine an absolute angular position of the shaft. The encoding zone 6 therefore forms a circular track in this embodiment. However, if the angular encoder is used only to detect a rotation or a direction of rotation of the shaft, the presence of polarized marks around the entire perimeter of the sleeve 2 is unnecessary.

The sensor 7 must be designed to detect a variation in the magnetic field and, to do this, a Hall-effect sensor or equivalent may in particular be used. The sensor 7 is positioned statically facing the circular encoding zone 6 formed by the polarized marks so as to detect the magnetic field variations.

The encoding zone 6 comprises a permanent magnet 4 that generates a bipolar or multipolar magnetic field so as to form one or more polarized marks detected by the sensor 7. All types of known permanent magnets taking the form of a rigid part produced before the manufacture of the displacement encoder 1 may be used. Permanent magnets generate more intensive fields than those that can be obtained with elastoferrite-type material, so that the gap, that is to say the distance separating the encoding zone from the sensor 7, may be larger and a less sensitive magnetic sensor can be used.

The type of permanent magnet 4 is chosen in particular according to its cost and the desired intensity of the polarized marks. For example, the permanent magnet is of the sintered type, that is to say formed from magnetic particles agglomerated together by sintering, also called ceramic magnets. This type of magnet, like for example magnets comprising strontium ferrite or samarium-cobalt, generates higher magnetic fields than elastoferrites—about twice as high in the case of samarium-cobalt. The magnetic field of sintered magnets based on samarium-cobalt decreases little when the temperature rises, and therefore they are advantageous for producing encoders that have to operate over a wide temperature range, for example from −50° C. to +250° C.

Sintered magnets based on neodymium iron boron (NdFeB) generate even higher magnetic fields and are less brittle, but they are more expensive and much more sensitive to corrosion.

Alnico magnets, whether moulded or sintered, generate modest magnetic fields, but higher than ferrite ceramic magnets. Alnico magnets possess the widest useable temperature range, for example from −40° C. to +525° C. In addition, Alnico magnets, based on aluminium, nickel, cobalt and iron, are among the most corrosion resistant.

In all cases, the permanent magnets are in the form of a very rigid part.

It is also possible to use a plastic magnet in the form of a relatively rigid part in which the magnetic particles, such as for example rare earths, strontium ferrites or samarium-cobalt, are bonded together by plastic or thermoplastic. Certain plastic magnets, and especially those of the samarium-cobalt type, have the advantage of generating intensive magnetic fields that are stable over time. In addition, plastic magnets may be produced in a variety of forms.

The magnet 4 has a front face 4b, placed on the outer surface of the angular encoder 1, a rear face 4a, on the opposite side from the front face 4b, and lateral faces 4c joining the front and rear faces. It should be noted that the rear face 4a is not in contact with the sleeve 2.

The permanent magnet 4 may optionally be covered with a protective layer so as to improve its resistance to oxidation and abrasion in the harsh environment of the displacement encoder—water, dust, sand, mud, etc. This protective layer, not shown in the figures owing to its small thickness, may consist of various materials deposited by a variety of processes. This protective layer may for example be:

a polymer layer, having a high surface resistance. For example, this protective layer may be made of PTFE which, apart from a sufficient surface abrasion resistance, has the advantage of being non-stick so that the accumulation of dust on the permanent magnet is avoided;

a paint;

an elastomeric adhesive. This adhesive may be deposited on all the faces of the permanent magnet 4, and will allow the faces 4a and 4c to adhere to an elastomer layer 10 and, in the case of the face 4b, will protect the permanent magnet 4. This solution simplifies the method of manufacture and is inexpensive; and a thin film of plasma-deposited material. For example, this film may be formed from amorphous carbon or from silicon oxides and have a thickness ranging for example between 50 nanometres and 500 nanometres. By using plasma deposition, the protective layer obtained adheres with a very thin bond of sufficient strength to withstand abrasion and corrosion caused by a harsh environment.

An elastomer layer 10 is moulded between the unexposed faces (4a, 4c) of the permanent magnet 4 and the sleeve 2 and allows the permanent magnet 4 to be mechanically fastened to the sleeve 2 thanks to its capability of adhering to metallic materials and plastics. In addition, the elastomer used, comprising natural or synthetic rubbers or thermoplastic elastomers, is very resistant to mechanical stresses, especially vibration and thermal expansion stresses, and it is satisfactorily resistant to most chemicals that may be encountered in the environment of a displacement encoder.

The elastomer layer 10 makes it possible to take up the deformations due to thermal expansion of the sleeve 2 relative to the permanent magnet 4. This advantage provided by the elastomer layer 10 makes it possible for the permanent magnet 4 to be kept correctly positioned, both axially and radially, and for the sensor 7 to deliver a displacement signal of better quality and with smaller thermal variations. This advantage is particularly useful, for example, in the case of a displacement encoder used on an internal combustion engine.

The high rigidity of the permanent magnet 4 makes it possible to limit the intrinsic vibrations of that element. Furthermore, the high rigidity of the permanent magnet 4 relative to the low rigidity of the elastomer layer 10 means that the transmission of vibrations from the sleeve 2 into this permanent magnet is limited. The overall reduction in vibrations of the permanent magnet 4 also allows the sensor 7 to deliver a displacement signal of better quality and better stability.

The elastomer layer 10 between the rear face 4a of the permanent magnet 4 and the sleeve 2 has a thickness $e_1$ measured perpendicular to the front face 4b, whereas the lateral faces 4c are surrounded by an elastomer layer having a thickness $e_2$.

Depending on the applications for which the displacement encoder is intended, the thickness $e_1$ and the nature of the elastomer used for the layer 10 allow the characteristics of filtering out the vibrations of the permanent magnet 4 to be adjusted.

For example, the greater the thickness $e_1$ or the more flexible the elastomer used, the more the vibrations will be attenuated. However, the thickness $e_1$ cannot be too large for reasons of space and of excessively large deflection of the permanent magnet 4. Thus, the thickness $e_1$ of the elastomer layer beneath the permanent magnet 4 may take a value between 0.01 mm and 3 mm.

The elastomer used for the layer 10 could possess a high damping capability if it is required to damp the vibrations of the permanent magnet 4 for certain resonant vibration effects.

The elastomer of the layer 10 may optionally be a thermoplastic elastomer. In this case, and if the sleeve 2 is made of plastic, the elastomer layer 10 may adhere to the sleeve 2 naturally, that is to say without an adhesion layer on the sleeve 2, and therefore very inexpensively.

The permanent magnet 4 is chosen so as to have the form of a thin part, that is to say the thickness of which, measured between the rear face 4a and the front face 4b, indicated by h in FIG. 1, is substantially less than the width L of the encoding zone 6. A thickness h of the magnet 4 between one sixth and one third of the width L of the encoding zone provides a good compromise between the intensity of the magnetic field generated and the available space along the axis X of the displacement encoder.

The encoding zone 6 has an annular shape surrounding the entire periphery of the shaft, especially for the purpose of encoding an absolute angular position of the shaft or to determine, almost instantaneously, the rotation speed of the shaft or its direction of rotation. To form an annular encoding zone, one or more permanent magnets are placed against the sleeve 2 so as to describe a circle concentric with the shaft.

For example, in the embodiment shown in FIG. 1, the sleeve 2 has an annular flange 12 extending radially relative to the longitudinal axis X. The circular encoding zone 6 is therefore formed from a multipolarly magnetized annular magnet 4, possibly with singularities. The permanent magnet 4 then has the form of a flat ring placed concentrically with the longitudinal axis X, allowing the entire encoding zone to be formed with precision. However, it is perfectly conceivable to produce the encoding zone using several permanent magnets in the form of an angular portion of a flat ring, the circumferential end faces of two consecutive magnets being placed against each other so as to form a continuous encoding zone. It is also conceivable to place one or more magnets for example in the form of inserts so as to form a single mark or a few spaced-apart marks.

It should be noted that the magnet 4 has a width L that allows most, here about 75%, of the portion of the sleeve 2 formed by the flange 12 to be covered.

In the embodiment shown in FIG. 1, the elastomer layer 10 extends radially relative to the shaft 3 beyond the flange 12 so as to come into contact with the wall 5a of the stationary casing. Thus, the layer 10 forms a sealing lip 11 in sliding rotary contact with the casing 5. The elastomer layer 10 and the lip 11, made as one piece with the latter, are produced simultaneously during the manufacturing process.

The angular encoder 1 thus produced fulfils a dynamic sealing function in addition to its encoding function. This embodiment of the angular encoder is therefore most particularly intended for a device such as an engine or a gearbox, in which the casing 5 filled with a liquid H, possibly under pressure, is penetrated by a shaft 3, in order to seal between the shaft and the casing.

In this embodiment, the base of the lip 11 extends substantially along the extension of the layer 10 and is bent over, in the configuration shown, when fitting the angular encoder onto the shaft 3. The end 11a of the lip may include, on its surface in contact with the stationary casing 5, grooves 11b that improve the dynamic sealing between the lip and the radial surface 5a of the casing facing the shaft 3.

Of course, it is possible for the lip 11 to have a more complex geometrical configuration so as to match the configuration of the surface with which it has to be in contact or to enhance its sealing properties.

Figure 2:
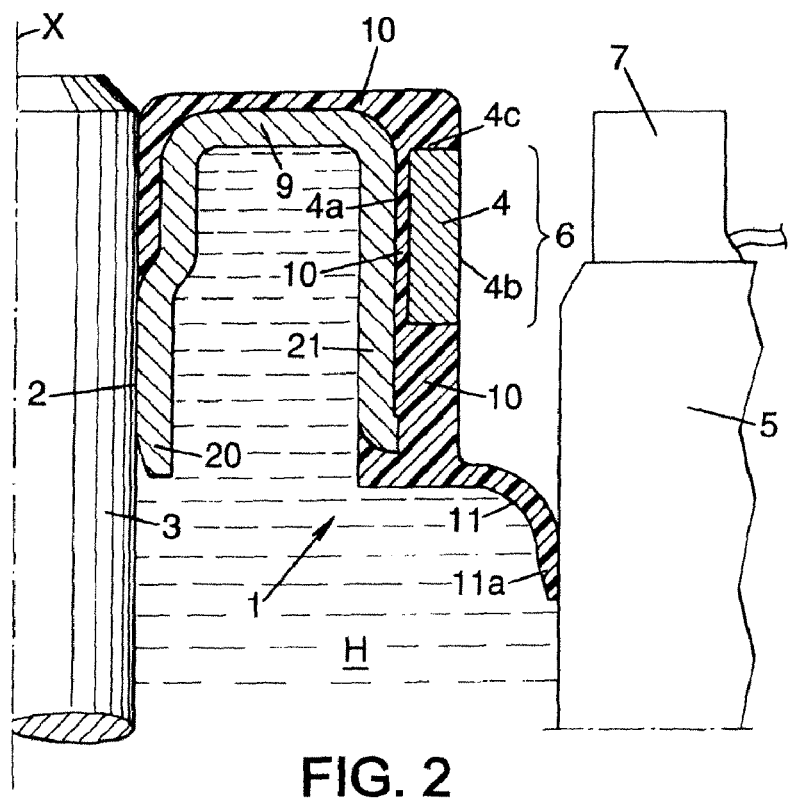
FIG. 2 is a sectional view similar to FIG. 1 of a second embodiment.

FIG. 2 shows a second embodiment, similar to the first one, that is to say having a sealing lip 11 integrally formed with the elastomer layer 10.

In this second embodiment, the encoding zone 6 extends longitudinally and is oriented radially towards the sensor 7. The encoding zone 6 is formed by a cylindrical tubular magnet 4 that surrounds an outer cylindrical wall of the sleeve 2 coaxial with the longitudinal axis X and is separated therefrom by a distance $e_1$, in such a way that the encoding zone is annular and concentric with the shaft 3. Use of a one-piece tubular magnet allows the polarized marks to be positioned very precisely, but it is also possible to use several magnets.

The elastomer layer 10 covers the entire outer surface of the sleeve 2. The magnet 4 covers, with its internal cylindrical surface 4a, part of this elastomer layer 10.

The sleeve 2 has a U-shaped cross section, a first leg 20 of the U gripping the shaft 3, a second leg 21 supporting the magnet 4, and the base 9 of the U partly filling the gap between the shaft 3 and the casing 5.

Figure 3:
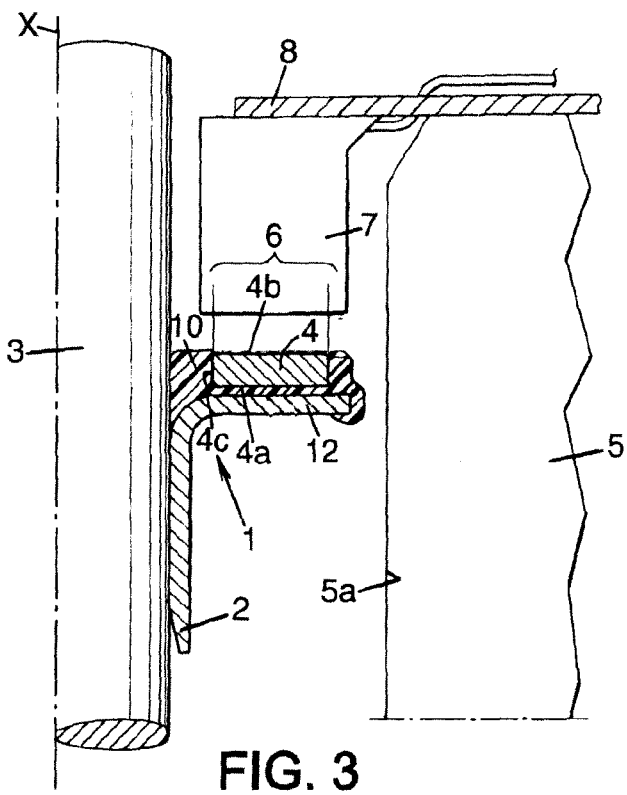
FIG. 3 is a sectional view similar to FIG. 1 of a third embodiment.

FIG. 3 shows a third embodiment, similar to the first one. In this embodiment, the sealing lip 11 has been deleted.

Figure 4:
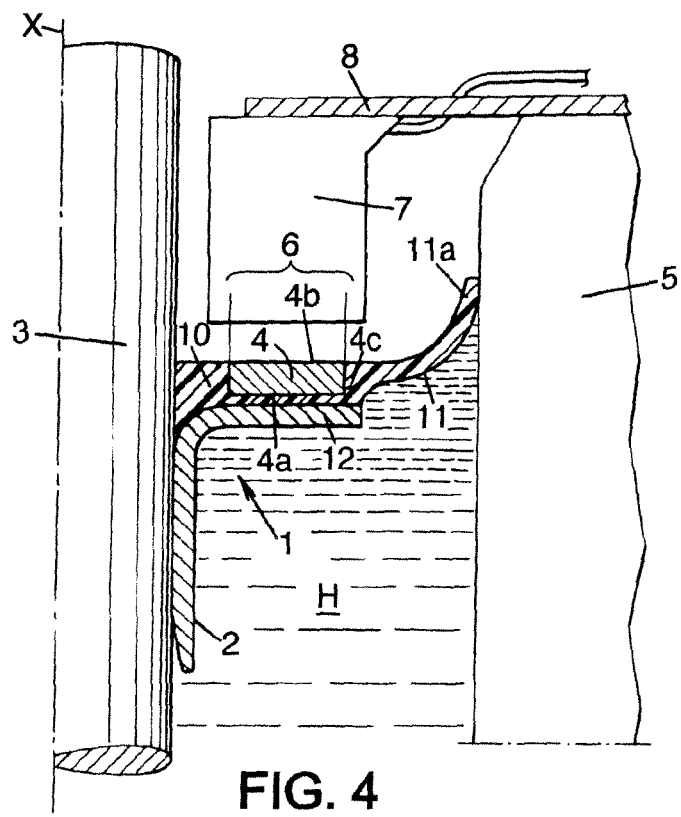
FIG. 4 is a sectional view similar to FIG. 1 of a fourth embodiment.

FIG. 4 shows a fourth embodiment, similar to the first embodiment, that is to say having a sealing lip 11 integrally formed with the elastomer layer 10. In this fourth embodiment, the lip 11 is bent towards the outside of the casing 5 filled with a liquid H.

Figure 5:
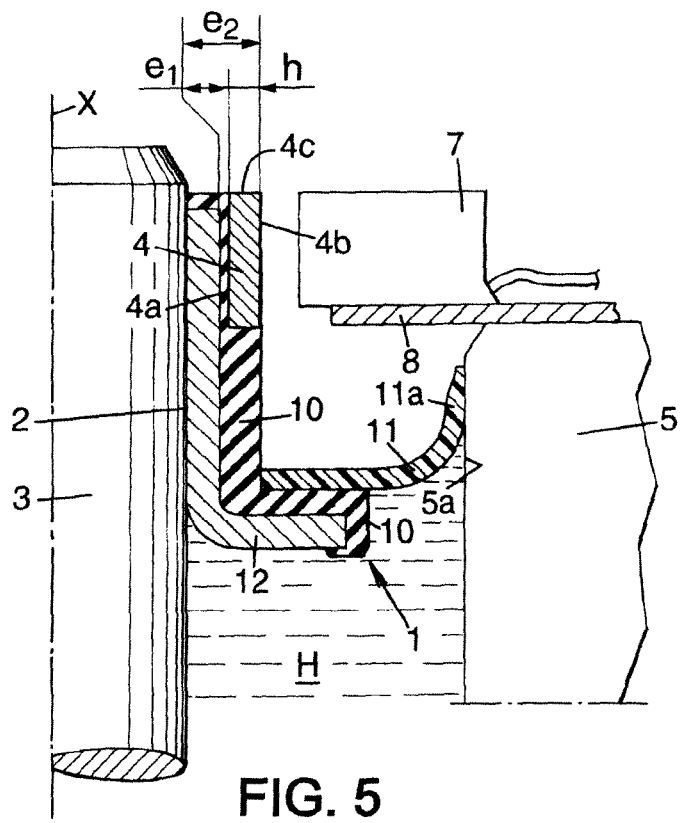
FIG. 5 is a sectional view similar to FIG. 1 of a fifth embodiment.

In the embodiment shown in FIG. 5, the L-shaped sleeve 2 has a first leg 20 of the L, which grips the shaft 3, and a radial annular flange 12. The first leg 20 supports the permanent magnet 4 via the elastomer layer 10. The annular flange 12 is covered by elastomer integrally formed with the layer 10, and forming a support surface to which a PTFE (polytetrafluoroethylene) sealing lip 21 can be adhered.

Figure 6:
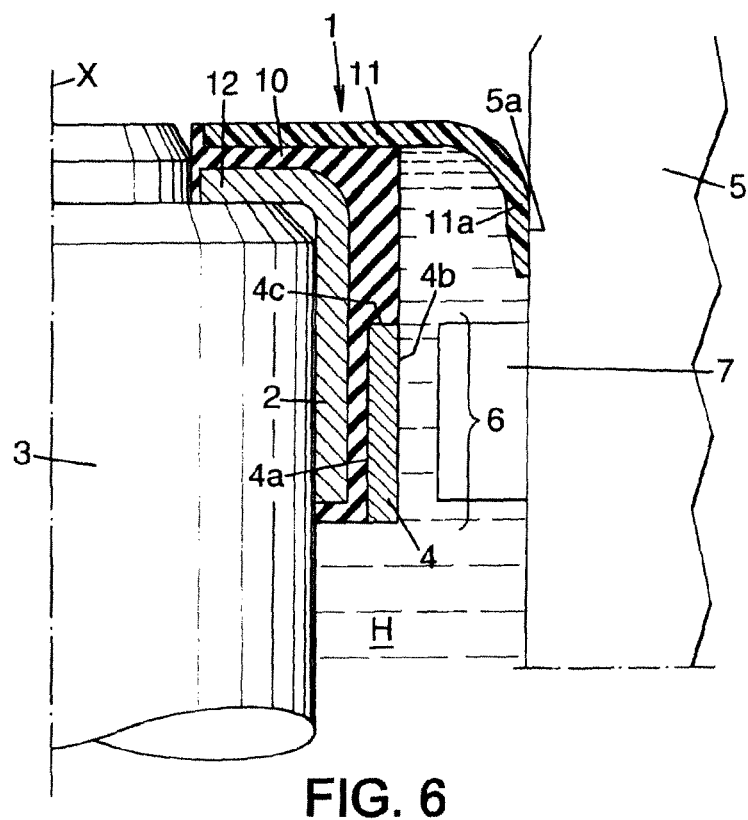
FIG. 6 is a sectional view similar to FIG. 1 of a sixth embodiment.

In a sixth embodiment, shown in FIG. 6, the sensor 7 is placed in the internal space of the casing that contains the liquid H, against the wall 5a of the casing, and facing radially towards the shaft 3. A sleeve 2 has an L-shaped cross section with a first leg 20 of the L, which grips the shaft 3, and an annular flange 12 extending radially and concentrically with respect to the longitudinal axis X and bearing on a shoulder 30 of the shaft 3. The annular flange 12 is covered by an extension of the elastomer layer 10, which also forms a support for a lip 21.

Figure 7:
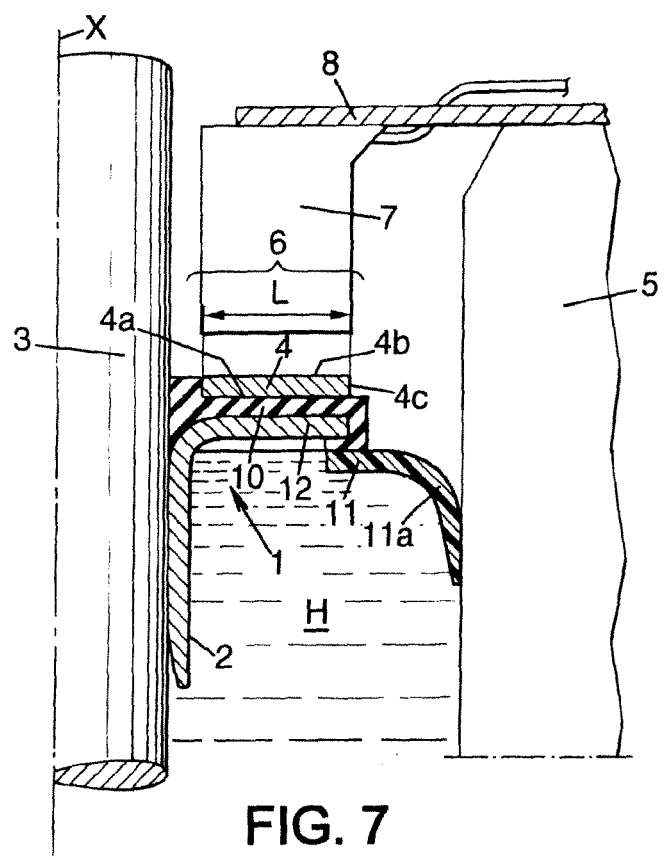
FIG. 7 is a sectional view similar to FIG. 1 of a seventh embodiment.

FIG. 7 shows a seventh embodiment, similar to the first embodiment. In this embodiment, the elastomer layer 10 partly covers the inner face of the flange 12 so as to act as a support for the PTFE lip 21.

Figure 8:
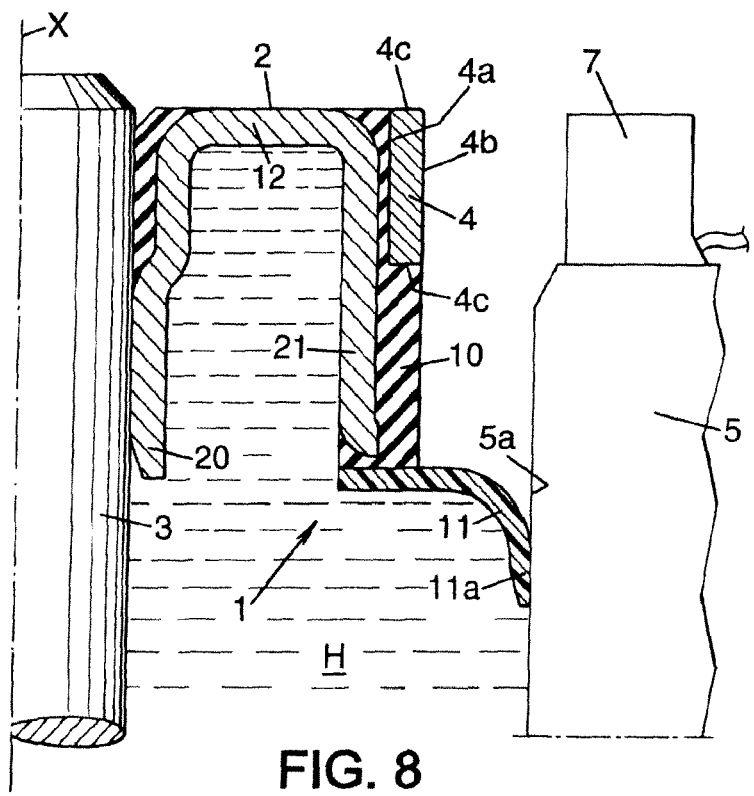
FIG. 8 is a sectional view similar to FIG. 1 of an eighth embodiment.

FIG. 8 shows an eighth embodiment, similar to the second embodiment. In this embodiment, the PTFE lip 21 is supported by the elastomer layer 10 and is located at the end of the second leg 21 of the sleeve 2 having a U-shaped cross section. In this last embodiment, the permanent magnet 4 has a radially oriented encoding face 4b. It is supported by one leg of the U-shaped sleeve, on the opposite side from that in direct contact with the moving shaft 3.

The angular encoder 1 may be produced by the manufacturing method comprising the following steps:

(i) said sleeve 2 is placed in a first half-mould;

(ii) the permanent magnet 4 is placed in a second half-mould. This permanent magnet 4 may be held in place in this second half-mould by various methods, which include mechanical means, magnetic means, pneumatic suction means or any other means for preventing the permanent magnet 4 from moving in the second half-mould throughout the steps of the manufacturing process;

(iii) the mould is closed, the permanent magnet 4 lying at some distance from the sleeve 2; and (iv) an elastomer layer 10, introduced beforehand between the sleeve 2 and the permanent magnet 4, is vulcanized so as to shape said elastomer layer 10 to a defined profile and to adhere said elastomer layer 10 to the sleeve 2 and to the permanent magnet 4.

According to a first variant of the manufacturing method, the elastomer layer is introduced prior to the vulcanization step (iv) by injection or transfer into the closed mould.

In a second variant of the manufacturing method, the elastomer layer is introduced prior to the vulcanization step (iv) by placing an elastomer preform in the mould before it is closed.

Furthermore, it is possible, prior to steps (i) and (ii), to carry out a surface treatment of the sleeve 2 and/or of the permanent magnet 4 by a suitable treatment comprising the deposition of at least one adhesion layer. These surface treatment steps allow the elastomer layer 10 to adhere during its vulcanization, that is to say allow chemical bonds to be created between the polymer of the elastomer used in the layer 10 and the adhesion layer.

This treatment may vary depending on the nature of the sleeve 2, and especially whether it is a metal or plastic sleeve. For example, in the case of a metal sleeve, the surface treatment may firstly include a degreasing operation, which is followed by a phosphating operation.

Said adhesion layer may be in the form of a very thin film of a chemical precursor, consisting for example of a phenolic resin.

This treatment may also vary substantially, depending on whether the magnet is a magnet consisting of sintered magnetic particles or a plastic magnet. However, the treatment of the permanent magnet also includes the deposition of at least an adhesion layer.

The surface treatment and the deposition of at least an adhesion layer, and more particularly on a magnet consisting of sintered magnetic particles, may be very advantageous for providing, in addition to adhesion, effective and economic corrosion protection for this permanent magnet 4.

It should be noted that the surface treatments carried out on the sleeve 2 and on the permanent magnet 4 may differ substantially owing to the nature of their material and their initial surface finish.

Another manufacturing step prior to step (iii) may be added, during which a preform of a sealing lip 11 is placed concentrically in the first half-mould. This lip, possibly made of PTFE, then adheres to the elastomer layer 10 during step (iv) of vulcanizing said elastomer layer.

Finally, an operation to form the polarized marks, by applying a magnetic field to the permanent magnet 4, is provided after the vulcanization step (iv). Thus, the permanent magnet, non-magnetized or demagnetized or unipolarly magnetized during its manufacturing process, is converted into a multipolar magnet forming a succession of angular sectors polarized alternately north-south, allowing a displacement encoder to be obtained.

Of course, the embodiments described above are in no way limiting. In particular, it is possible to produce an angular encoder with a permanent magnet 4 that does not extend along a radial or longitudinal direction but in a direction inclined to the shaft.

Moreover, it will be apparent to those skilled in the art that the invention may be applied to a linear encoder, fastened to a sliding shaft, the encoding zone of which comprises one or more magnets. In this type of application, the encoding zone has one or more polarized marks distributed along the sliding direction of the shaft, so as to be suitable for encoding a linear displacement.

What is claimed is:

1. Displacement encoder for a moving shaft, comprising a sleeve fitted onto the shaft and at least one rigid permanent magnet forming at least one polarized magnetic mark, characterized in that a soft elastomer layer lies between the permanent magnet and the sleeve, so that the permanent magnet is not in contact with the sleeve and so that the elastomer layer attenuates vibrations between; and in that said elastomer layer is adhesively bonded to the permanent magnet and to the sleeve,
   wherein the elastomer layer is one of a rubber material or a thermoplastic elastomer material.

2. Displacement encoder according to claim 1, in which the elastomer layer has a thickness ranging between 0.01 mm and 3 mm.

3. Displacement encoder according to claim 1, in which the elastomer layer is made of a thermo plastic elastomer.

4. Displacement encoder according to claim 1, in which the permanent magnet is a plastic magnet.

5. Displacement encoder according to claim 1, in which the permanent magnet has a protective layer.

6. Displacement encoder according to claim 5, in which the protective layer is a thin film of material plasma-deposited directly on the permanent magnet.

7. Displacement encoder according to claim 5, in which the protective layer is an elastomeric adhesive.

8. Displacement encoder according to claim 1, in which the sleeve is made of plastic.

9. Displacement encoder according to claim 1, in which at least one annular lip is in contact with a stationary casing that surrounds the moving shaft.

10. Device comprising a shaft that can move relative to a stationary casing and a displacement encoder that comprises a sleeve fitted onto the shaft and a rigid permanent magnet forming at least one polarized magnetic mark, characterized in that a soft elastomer layer lies between the permanent magnet and the sleeve, so that the permanent magnet is not in contact with the sleeve and so that the elastomer layer attenuates vibrations between; and in that said elastomer layer is adhesively bonded to the permanent magnet and to the sleeve,
    wherein the elastomer layer is one of a rubber material or a thermoplastic elastomer material.

11. Device according to claim 10, in which a liquid fills the casing and in which at least one annular lip is fastened to the encoder, said lip being in sliding contact with the casing and sealing between said shaft and said casing.

12. Displacement encoder according to claim 1, wherein the permanent magnet is recessed within the elastomer layer.

13. Displacement encoder according to claim 1, wherein the elastomer layer is adhesively bonded to the permanent magnet on at least two sides of the permanent magnet.

14. Displacement encoder according to claim 1, wherein the permanent magnet is a ceramic permanent magnet.

* * * * *